United States Patent
Qin et al.

(10) Patent No.: US 7,120,835 B2
(45) Date of Patent: Oct. 10, 2006

(54) COMPUTER EQUIPMENT HAVING A PROMPT ACCESS FUNCTION AND RELATED METHOD

(75) Inventors: Simon Qin, Chongqing (CN); Jiessie Zhang, Chongqing (CN)

(73) Assignee: Far Stone Tech, Inc., Irvine, CA (US)

(*) Notice: Subject to any disclaimer, the term of this patent is extended or adjusted under 35 U.S.C. 154(b) by 487 days.

(21) Appl. No.: 10/241,626

(22) Filed: Sep. 11, 2002

(65) Prior Publication Data
US 2003/0149910 A1 Aug. 7, 2003

(30) Foreign Application Priority Data
Feb. 1, 2002 (TW) .............................. 91101762 A

(51) Int. Cl.
*G06F 11/00* (2006.01)
(52) U.S. Cl. ........................................ 714/46; 707/204
(58) Field of Classification Search ................ 714/46, 714/15; 707/202, 204
See application file for complete search history.

(56) References Cited

U.S. PATENT DOCUMENTS

| | | | |
|---|---|---|---|
| 5,748,880 A * | 5/1998 | Ito et al. ........................ | 714/46 |
| 6,567,937 B1 * | 5/2003 | Flores et al. ................... | 714/46 |
| 6,611,850 B1 * | 8/2003 | Shen ............................ | 707/204 |

* cited by examiner

*Primary Examiner*—Dieu-Minh Le
(74) *Attorney, Agent, or Firm*—Hogan & Hartson LLP

(57) ABSTRACT

Computer equipment having a prompt access function that can be operated prior to booting an operating system. The computer equipment comprises a processing system and a displaying system. The processing system has hardware resources with a backup/recovery module. The backup/recovery module establishes at least one recovery unit to hold backup data. The displaying system is used for displaying data contained in the processing system, corresponding to the recovery unit. The displaying system has a selecting means for selecting a status corresponding to the processing system. Thereafter, the displaying system displays the selected status. In the computer equipment of the invention, there is no limit on the amount of the recovery units which can be accessed simultaneously. The recovery unit is only loaded when it is required. Consequently, system resources can be saved, and mis-operation can be prevented.

20 Claims, 2 Drawing Sheets

COMPUTER EQUIPMENT HAVING A PROMPT ACCESS FUNCTION AND RELATED METHOD

BACKGROUND OF THE INVENTION

1. Field of the Invention

The present invention relates generally to computer equipment having a prompt access function, and more particularly to a computer equipment and method that does not need to mount restore points in advance, while unlimited restore points can simultaneously be accessed at once.

2. Description of Prior Art

Conventional backup/recovery softwares often create recovery points to backup data in a computer system for restoring the computer system to a state of creating the recovery points. For example, the conventional backup/recovery software, such as the Goback software developed by Adaptec Corporation, adopt a dynamic backup technique in creating recovery points. The valid data is backed up prior to making changes to the data. Such Goback software developed by Adaptec Corporation can restore the computer system to a previous state, in accordance with the backed up data, from a current state.

The conventional backup/recovery software must mount every recovery points before such recovery points can be accessed. Each recovery point is mounted as a logical drive respectively, and attach to the computer system, so as to make available for access. Users can access every logical drive in order to access every file contained in the corresponding recovery point. These recovery points can make users to preview the contents of the recovery point prior to restoring the computer system.

Prior to viewing the previous created recovery points, these recovery points have to be mounted as logical drives. Meanwhile, these recovery points should be loaded into a main memory.

However, these recovery points can't be viewed simultaneously. The reason is that the operating system (OS) can only support twenty-six drives at most, that is, from A to Z. Accordingly, the conventional backup/recovery software only allow users to view twenty-three recovery points at one time for drives A, B and C means A disk, B disk and C disk, located in the computer system. Moreover, these limited recovery points are indirect in checking to make users mis-operated.

In other words, every recovery point created by the conventional backup/recovery software has to be loaded into a main memory while the recovery points are mounted as the logical drives. The recovery points are loaded and executed with operating system (OS) intervention. This is done before the recovery points are previewed, and system resources are wasted consequently.

In addition, the users can even though preview the contents of the recovery point, however, users cannot realize whether the computer system can be booted or not if the computer system is restored to a certain state of creating the recovery points. Furthermore, this operation can only be implemented in the Windows operating system. Providing that the Windows operating system cannot be booted, the preview operation cannot be implemented.

SUMMARY OF THE INVENTION

The present invention provides a computer equipment having a prompt access function and related method to resolve the foregoing problems faced by the conventional backup/recovery software. The present invention has the advantage of using the resources of the computer system in a more effective way so as to economize on system resources occupied by the conventional backup/recovery software.

An object of the present invention is to provide a computer equipment having a prompt access function and related method, wherein no recovery point should be mounted. Only when users are going to check recovery point, such recovery point is mounted into the computer system for the sake of providing a user with an outcome of recovery operation beforehand. Users also can retrieve previous data including a boot procedure of the computer system without any recovery operation is actually implemented.

Another object of the present invention is to provide a computer equipment having a prompt access function and related method, which can provide a user with unlimited recovery points for prompt checking. While the user confirms a certain recovery point is one to be selected to restore the computer system to a previous corresponding state, the user can directly restore such computer system to such previous state, in accordance with such recovery point.

Further object of the present invention is to provide a computer equipment having a prompt access function and related method, which can be operated prior to booting the operating system (OS). Moreover, according to the present invention, even if Windows operating system (OS) is destroyed thoroughly, the user still can view recovery points and the outcome thereof. Recovery points are directly visible and clear to the users so mis-operation can be prevented.

In accordance with an aspect of the present invention, a computer equipment having a prompt access function is provided, which comprises a processing system and a displaying system. The processing system has hardware resources with a backup/recovery module. The backup/recovery module creates at least one recovery unit for holding backup data. The displaying system is used for displaying data contained in the processing system, corresponding to the recovery unit. The displaying system has a selecting means for selecting a status corresponding to the processing system. Thereafter, the displaying system displays the selected status.

In the preferred embodiment of the invention, the status corresponding to said processing system is a status of said computer equipment at the time creating said corresponded recovery unit. The data contained in the processing system corresponding to the recovery unit includes configuration corresponding to the hardware resource and the backup data held in the recovery unit respectively. The displaying system has a user-operating interface. The hardware resource includes a storage apparatus, such as a hard disk. The hard disk may include an operating system (OS), the operating system (OS) can be Disk Operating System (DOS), Windows 9x (Window 95, Window 98, Window Millennium, etc.), Linux, Windows NT, Window 2000, Window XP, Mac OS, or the like. The information for recovering previous status is provided on an interface for Disk Operating System (DOS).

In accordance with another aspect of the present invention, a recovery method for providing a user with an outcome of recovery operation beforehand is suitable for a computer system. The computer system includes a processing system and a displaying system. The processing system creates at least one recovery unit, and the displaying system displays data contained in the processing system corresponding to the recovery unit. The recovery method comprising the steps of: selecting one of the at least one recovery unit; mounting the selected recovery unit into the processing system; and displaying a status corresponding to the processing system which corresponds to the selected recovery unit.

In the preferred embodiment of the invention, the status corresponding to the processing system is a status of the computer equipment at the time creating the corresponded recovery unit. The data contained in the processing system corresponding to the at least one recovery unit includes configuration corresponding to the at least one hardware resource and the backup data held in the at least one recovery unit respectively. The displaying system has a user-operating interface. The computer system includes an operating system (OS), the operating system (OS) can be Disk Operating System (DOS), Windows 9x (Window 95, Window 98, Window Millennium, etc.), Linux, Windows NT, Window 2000, Window XP, Mac OS, or the like. The information for recovering previous status is provided on an interface for Disk Operating System (DOS).

In accordance with further aspect of the present invention, a backup system is suitable for a computer system. The computer system has a storage device and a displaying system. The storage device holds data, and the displaying system displays the data held in the storage device. The displaying system has a selecting means. The backup system comprises a backup module and a processing module. The backup module creates at least one recovery unit to backup data held in the storage device. The processing module processes data and creates at least one simulating unit. The simulating unit corresponds to the recovery unit. The simulating unit loads an operating system (OS) corresponding to the recovery unit. The displaying system displays data corresponding to the simulating unit. The selecting means selects one of the at least one recovery unit, and the displaying system displays the processed data.

In the preferred embodiment of the invention, the simulating unit may be created prior to loading the operating system (OS). The operating system (OS) can be Disk Operating System (DOS), Windows 9x (Window 95, Window 98, Window Millennium, etc.), Linux, Windows NT, Window 2000, Window XP, Mac OS, or the like. The information for recovering previous status is provided on an interface for Disk Operating System (DOS). The simulating unit may be created after the operating system (OS) is loaded. The processing module has a data computing unit for computing data held in the storage device and data stored in the at least one recovery unit. The simulating unit has entire data held in the storage device corresponding to the at least one recovery unit.

The present invention may best be understood through the following description with reference to the accompanying drawings, in which:

DETAILED DESCRIPTION OF THE PREFERRED EMBODIMENT

Figure 1:
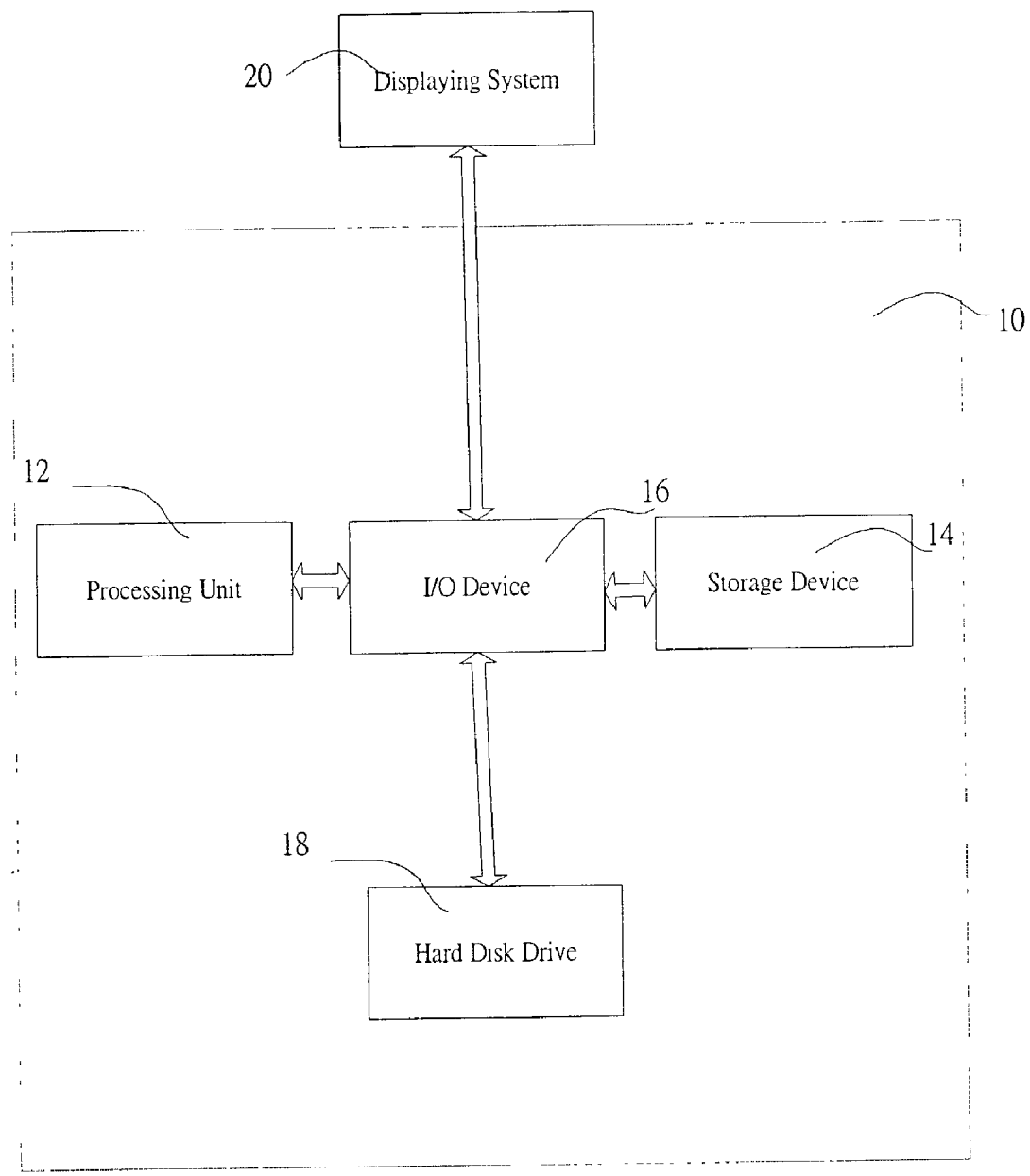
FIG. 1 is a schematic block diagram of a computer equipment of a preferred embodiment according to the present invention.

The present invention will now be described more specifically with reference to the following embodiments. It is to be noted that the following descriptions of preferred embodiments of this invention are presented herein for the purpose of illustration and description only. It is not intended to be exhaustive or to be limited to the precise form disclosed.

The present invention describes a new computer equipment with a virtually recovery utility, which can accomplish file access to the contents of the recovery point to make sure of the previous status to be restored after rebooting the computer system. No risk resulted from actual recovery operation is remained. Users can be well aware of an outcome of a certain recovery point beforehand.

With the computer equipment having a prompt access function and related method of the present invention, the users can operate under the DOS interface to check the contents of the recovery point. No recovery operation is implemented to retrieve previous data for the user can anticipate whether the computer system can be normally booted after the computer system is actually restored in accordance with such recovery point.

The users can also directly access unlimited recovery points promptly and simultaneously without such recovery points to be mounted in advance. Such recovery points can be mounted when it is required for checking in order to economize on system resources. Furthermore, files contained in the recovery points can be easily opened, viewed, copied, or the like. Therefore, the drawbacks faced by the prior arts can be solved completely.

According to the preferred embodiment of the present invention, a computer equipment having a prompt access function that can be operated prior to booting an operating system. The computer equipment comprises a processing system and a displaying system. A processing system has at least one hardware resource with a backup/recovery module. The backup/recovery module creates at least one recovery unit to hold backup data. A displaying system can display data contained in the processing system. The data contained in the processing system corresponds to the recovery unit. The displaying system has a selecting means. The selecting means selects a status corresponding to the processing system. The displaying system displays the selected status.

The status corresponding to the processing system is a status of said computer equipment at the time creating said corresponded recovery unit. The data contained in the processing system corresponding to the recovery unit includes configuration corresponding to the hardware resource and the backup data held in the recovery unit respectively. The displaying system has a user-operating interface. The hardware resource includes a storage apparatus, such as a hard disk. The hard disk may include an operating system (OS), the operating system (OS) can be Disk Operating System (DOS), Windows 9x (Window 95, Window 98, Window Millennium, etc.), Linux, Windows NT, Window 2000, Window XP, Mac OS, or the like. The information for recovering previous status is provided on an interface for Disk Operating System (DOS).

Referring to FIG. 1, a schematic block diagram of a computer equipment of a preferred embodiment according to the present invention is shown. The computer equipment of the present invention can access data in the computer system promptly. The computer equipment having a prompt access function includes a processing system 10 and a displaying system 20. The processing system 10 has at least one hardware resource for processing or operating, such as a computer system, wherein a processing unit 12, a storage device 14, and an I/O device 16 are included therein. The processing system 10 may also include a CD-ROM drive, a printer or a soft disk drive.

The I/O device 16 is coupled between the processing unit 12 and the storage device 14. The I/O device 16 is coupled to the hard disk 18 for storing data contained in the computer system. The storage device 14 may have a hard disk drive 18. Optionally, the storage device 14 may include a system memory for storing data. The I/O device 16 can be a system bus.

The processing system 10 has a backup/recovery module. The backup/recovery module can be a backup/recovery program. The backup/recovery program can be compressed in order to economize on storage space occupied by such program. The backup/recovery program can create at least one recovery point to hold backup data. The backup/recovery module can be installed in the storage device 14 or in the hard disk 18.

The hard disk 18 may include an operating system (OS), the operating system (OS) is selected from the group consisting of Disk Operating System (DOS), Windows, Linux, Windows NT, and Mac. Disk Operating System (DOS) can be operated prior to booting an operating system. Information for recovering previous status is provided on an interface for Disk Operating System (DOS).

The displaying system 20 coupled to the I/O device 16 can be used for displaying data contained in the processing system 10. The data contained in the processing system 10 corresponds to each recovery point. Each recovery point is demonstrated in a form of file folder to the users to facilitate operations for the users.

The displaying system 20 can display data stored in the storage device 14. The displaying system 20 may include a user-operating interface. The user-operating interface can be a keyboard, a mouse, or the like, to provide the user with inputting command and information.

The displaying system 20 may have a selecting means. The selecting means selects a status corresponding to the processing system 10. The displaying system 20 displays the selected status.

The status corresponding to the processing system 10 is a status of the computer equipment at the time creating the corresponded recovery point. The data contained in the processing system 10 corresponding to the recovery point includes configuration corresponding to the hardware resources at that time and the backup data held in the corresponded recovery point respectively.

While the user selects a recovery point with the selecting means and thereby selects the status corresponding to the processing system 10, the backup/recovery module thereafter loads drivers and operating interfaces. Each driver maps the access to configuration of the computer equipment into the access to the data in the corresponded recovery point.

Each recovery point is demonstrated in a form of file folder to the users to facilitate operations for the users. The users can conveniently extract directory or files inside the recovery points. The users can rename or remove any of them, view contents thereof, or perform recovery operation, simultaneously and immediately. After one recovery point is selected, the selected recovery point is opened to the user. The user can open executable files, pictures or documents without restoring the computer equipment to such status.

According to the preferred embodiment of the present invention, a recovery method for providing a user with an outcome of recovery operation beforehand is suitable for a computer system. The computer system includes a processing system and a displaying system. The processing system creates at least one recovery unit, and the displaying system displays data contained in the processing system corresponding to the recovery unit. The recovery method comprising the steps of: selecting one of the at least one recovery unit; mounting the selected recovery unit into the processing system; and displaying a status corresponding to the processing system which corresponds to the selected recovery unit.

The status corresponding to the processing system is a status of the computer equipment at the time creating the corresponded recovery unit. The data contained in the processing system corresponding to the at least one recovery unit includes configuration corresponding to the at least one hardware resource and the backup data held in the at least one recovery unit respectively. The displaying system has a user-operating interface. The computer system includes an operating system (OS), the operating system (OS) can be Disk Operating System (DOS), Windows 9x (Window 95, Window 98, Window Millennium, etc.), Linux, Windows NT, Window 2000, Window XP, Mac OS, or the like. The information for recovering previous status is provided on an interface for Disk Operating System (DOS).

After the user selects a recovery point, the selected recovery point is mounted into the processing system. A status corresponding to the processing system is displayed. The status corresponding to the processing system is a status of the computer equipment at the time creating the corresponded recovery unit, which corresponds to the selected recovery point. The user can open every recovery unit respectively in a manner of opening a file folder. The contents therein includes configuration corresponding to the computer equipment at the time creating the corresponded recovery point. The computer equipment may comprises a hard disk drive C, a CD-ROM drive D, or a printer. The configuration corresponding to the computer equipment is the configuration of the computer equipment at the time creating the corresponded recovery point.

By opening the selected recovery point, the user can view the contents thereof directly. For example, the user adds a printer on February 27, then, the configuration of the computer equipment for February 26 contains no such printer, while the configuration of February 28 contains.

The present invention can access unlimited recovery points simultaneously. Furthermore, the present invention does not need to mount restore points in advance. Accordingly, system resources can be saved, and mis-operation can be prevented owing to viewing such recovery points directly.

The present invention can be operated prior to booting an operating system. Even if the computer system cannot be booted due to the Windows operating system is destroyed thoroughly, the user still can check outcome of recovery operation.

The displaying system 20 displays the entire outcome of recovery operation, including a boot procedure of the computer system. Consequently, the user can directly and easily access unlimited restore points simultaneously and immediately. While restore point is checked, data stored therein can be opened, copied, in order to eliminate the risk resulted from actual recovery operation.

Upon the user selects a restore point under the DOS interface, the displaying system 20 displays an option for the user to obtain outcome of recovery operation corresponding to such restore point. If such restore point is selected, the operating system is loaded. After the user confirms that the restore point is the required restore point, the status corresponding to such restore point can be set as a current status.

According to the preferred embodiment of the present invention, a backup system is suitable for a computer system. The computer system has a storage device and a displaying system. The storage device holds data, and the displaying system displays the data held in the storage device. The displaying system has a selecting means. The backup system comprises a backup module and a processing module. The backup module creates at least one recovery unit to store data held in the storage device. The processing module processes data and creates at least one simulating unit. The simulating unit corresponds to the recovery unit. The simulating unit loads an operating system (OS) corresponding to the recovery unit. The displaying system displays the simulating unit. The selecting means selects one of the at least one recovery unit, and the displaying system displays the processed data.

The simulating unit may be created prior to loading the operating system (OS). The operating system (OS) can be Disk Operating System (DOS), Windows 9x (Window 95, Window 98, Window Millennium, etc.), Linux, Windows NT, Window 2000, Window XP, Mac OS, or the like. The information for recovering previous status is provided on an interface for Disk Operating System (DOS). The simulating unit may be created after the operating system (OS) is loaded. The processing module has a data computing unit for computing data held in the storage device and data stored in the at least one recovery unit. The simulating unit has entire data held in the storage device corresponding to the at least one recovery unit.

Figure 2:
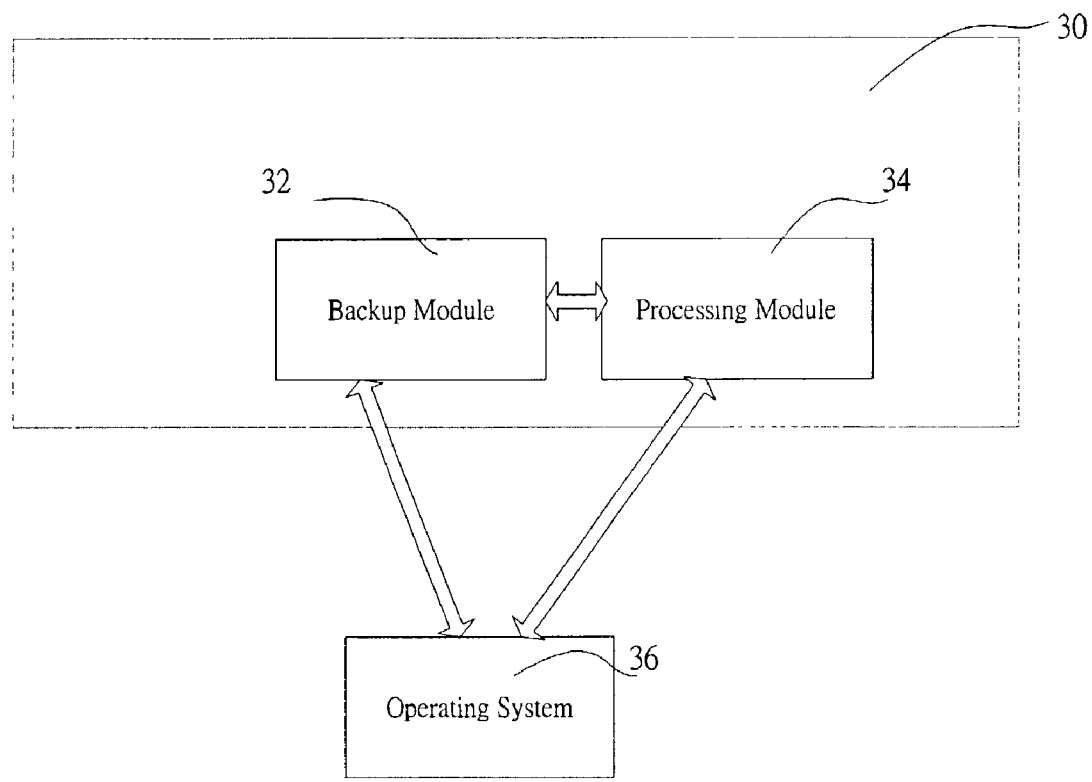
FIG. 2 is a schematic block diagram showing the components of a backup/recovery system of a preferred embodiment and an operating system relevant to loading operation according to the present invention.

Referring to FIG. 2, a schematic block diagram of a backup/recovery system of a preferred embodiment according to the present invention is shown. According to the present invention, the backup/recovery system 30 of the present invention is suitable for a computer equipment, which includes a storage device 14 and a displaying system 20. FIG. 2 shows only the components of the backup/recovery system 30 that are required to provide the computer equipment with prompt access function. As shown in FIG. 2, the backup/recovery system 30 comprises a backup module 32 and a processing module 34.

The backup module 32 can create at least one recovery point to hold data stored in the storage device 14. The recovery points may be stored in a hard disk drive 18 of the computer equipment, a network communicated with the computer equipment, or a storage media, such as a CD-RW, a tape, or the like.

The backup module 32 can be a static backup/recovery module, a dynamic backup/recovery module, an integrated backup/recovery module, or the like, can all be adopted in the backup/recovery system 30. The backup module 32 is used for backing up data stored in the storage device 14 of the computer equipment, particularly stored in the hard disk drive 18.

The processing module 34 includes a computing unit and at least one simulating unit. The computing unit is used for computing data stored in the storage device 14 and data in the recovery points. After data computing, the simulating units corresponding to the recovery points are created. The simulating unit emulates the computer equipment.

The processing module 34 computes data in the current computer equipment and data backed up in the backup module 32, and creates the simulating unit having entire data in the storage device 14 thereafter. The entire data in the storage device 14 is the actual data at the time the recovery point is created.

In FIG. 2, an operating system (OS) 36 relevant to loading operation is shown. The simulating unit loads the operating system (OS) 36 corresponding to the recovery point. One simulating unit may be taken over by another anytime.

The operating system (OS) 36 is selected from the group consisting of Disk Operating System (DOS), Windows, Linux, Windows NT, and Mac. Disk Operating System (DOS) can be operated prior to booting an operating system. Information for recovering previous status is provided on an interface for Disk Operating System (DOS).

The displaying system 20 displays the simulating unit, then one of the recovery points is selected through the selecting means, and the displaying system 20 displays the computed data.

The computing unit computes data in the current computer equipment and backup data held in the recovery point. Afterward the simulating unit corresponding to the recovery point is created.

The simulating units can be created before or after loading the operating system (OS) 36. In the event of creating the simulating unit prior to loading the operating system (OS) 36, the simulating unit can load any operating system (OS) 36 corresponding to any recovery point.

While the simulating units is created after the operating system (OS) 36 is loaded, in that case, the status of the computer equipment at the time every certain recovery point is created can be viewed under the operating system (OS) 36.

The backup/recovery system of the present invention can emulate the computer equipment. Data therein at the time creating the recovery point can be viewed, added or removed. Moreover, the simulating unit can load the operating system prior to booting the operating system (OS), which is distinguishing from the conventional technique. Hence, the shortcoming that the data have to actually restore the computer system to a previous state can be entirely avoided.

The computer equipment having a prompt access function and related method according to the present invention can mount recovery point only when it is required. Furthermore, there is no limit on the amount of the recovery points which can be accessed simultaneously. The present invention also provides a user with an outcome of recovery operation beforehand so that the questionable problem of the system booting normally faced by the conventional backup/recovery software can be fully solved.

According to the above description, it is evident that unlimited restore points can simultaneously be viewed and accessed at once. It is unnecessary to occupy the system resources in advance. In addition, the present invention provides the user with a preview of restore points even though the computer system cannot be booted already.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer equipment having a prompt access function, said computer equipment comprising:
   a processing system having at least one hardware resource with a backup/recovery module, said backup/recovery module creating at least one recovery unit to hold backup data; and a displaying system for displaying backed up data of said processing system, said backed up data of said processing system corresponding to each of said at least one recovery unit, said displaying system having a selecting means, said selecting means selecting a status corresponding to said processing system at the time of creation of each of said at least one recovery unit, said displaying system displaying said selected status;

wherein said at least one recovery unit respectively reflects a corresponding status of said at least one hardware resource at the time of creation of each of said at least one recovery unit, said at least one hardware resource can be restored to status at the time of creation of each of said at least one recovery unit.

2. The computer equipment according to claim 1, wherein said status corresponding to said processing system is a status of said computer equipment at the time creating said corresponded recovery unit.

3. The computer equipment according to claim 1, wherein said data contained in said processing system corresponding to said at least one recovery unit includes configuration corresponding to said at least one hardware resource and said backup data held in said at least one recovery unit respectively.

4. The computer equipment according to claim 1, wherein said displaying system has a user-operating interface.

5. The computer equipment according to claim 1, wherein said at least one hardware resource includes a storage apparatus.

6. The computer equipment according to claim 1, wherein said at least one hardware resource includes a hard disk.

7. The computer equipment according to claim 6, wherein said hard disk includes an operating system (OS), said operating system (OS) is selected from the group consisting of Disk Operating System (DOS), Windows, Linux, Windows NT, and Mac.

8. The computer equipment according to claim 7, wherein information for recovering previous status are provided on an interface for Disk Operating System (DOS).

9. A recovery method for providing a user with an outcome of recovery operation beforehand, suitable for a computer system including a processing system and a displaying system, said processing system creating at least one recovery unit, said displaying system displaying backed up data of said processing system corresponding to said recovery unit, said recovery method comprising the steps of:

selecting one of said at least one recovery unit;
loading said selected recovery unit into said processing system; and
displaying a status corresponding to said processing system which corresponds to said selected recovery unit,
wherein said at least one recovery unit respectively reflects a corresponding status of at least one hardware resource of said processing system at the time of creation of each of said at least one recovery unit, said at least one hardware resource can be restored to status at the time of creation of each of said at least one recovery unit.

10. The recovery method according to claim 9, wherein said status corresponding to said processing system is a status of said computer equipment at the time creating said corresponded recovery unit.

11. The recovery method according to claim 9, wherein said data contained in said processing system corresponding to said at least one recovery unit includes configuration corresponding to said at least one hardware resource and said backup data held in said at least one recovery unit respectively.

12. The recovery method according to claim 9, wherein said displaying system has a user-operating interface.

13. The recovery method according to claim 9, wherein said computer system includes an operating system (OS), said operating system (OS) is selected from the group consisting of Disk Operating System (DOS), Windows, Linux, Windows NT, and Mac.

14. The recovery method according to claim 13, wherein information for recovering previous status are provided on an interface for Disk Operating System (DOS).

15. A backup system, which is installed in a computer system having a storage device and a displaying system, said storage device holding data, said displaying system displaying said data held in said storage device, said displaying system having a selecting means, said backup system comprising:

a backup module for creating at least one recovery unit to backup data held in said storage device; and
a processing module for processing data and creating at least one simulating unit, said at least one simulating unit corresponding to said at least one recovery unit, wherein
said simulating unit loads an operating system (OS) corresponding to said recovery unit, said displaying system displays data corresponding to said simulating unit, said selecting means selects one of said at least one recovery unit, and said displaying system displays said processed data,
wherein said at least one recovery unit respectively reflects a corresponding status of at least one hardware resource of said computer system at the time of creation of each of said at least one recovery unit, said at least one hardware resource can be restored to status at the time of creation of said at least one recovery unit.

16. The backup system according to claim 15, wherein said simulating unit is created prior to loading said operating system (OS).

17. The backup system according to claim 15, wherein said operating system (OS) is selected from the group consisting of Disk Operating System (DOS), Windows, Linux, Windows NT, and Mac, wherein information for recovering previous status are provided on an interface for Disk Operating System (DOS).

18. The backup system according to claim 15, wherein said simulating unit is created after said operating system (OS) is loaded.

19. The backup system according to claim 15, wherein said processing module has a data computing unit for computing data held in said storage device and data stored in said at least one recovery unit.

20. The backup system according to claim 15, wherein said simulating unit has entire data held in said storage device corresponding to said at least one recovery unit.

* * * * *